United States Patent
Fritz et al.

(10) Patent No.: US 10,336,457 B2
(45) Date of Patent: Jul. 2, 2019

(54) SEAT RAIL COVER FOR COVERING A SEAT RAIL IN A VEHICLE FLOOR AND METHOD FOR MANUFACTURING A SEAT RAIL COVER

(71) Applicant: Airbus Operations GmbH, Hamburg (DE)

(72) Inventors: Markus Fritz, Hamburg (DE); Felix Lohan, Hamburg (DE); David Wottke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 3 days.

(21) Appl. No.: 15/487,966

(22) Filed: Apr. 14, 2017

(65) Prior Publication Data

US 2017/0297723 A1 Oct. 19, 2017

(30) Foreign Application Priority Data

Apr. 15, 2016 (DE) .................. 10 2016 206 386

(51) Int. Cl.
| | |
|---|---|
| *B64D 11/06* | (2006.01) |
| *B64C 1/18* | (2006.01) |
| *B60N 2/00* | (2006.01) |
| *B33Y 80/00* | (2015.01) |
| *B33Y 10/00* | (2015.01) |

(Continued)

(52) U.S. Cl.
CPC .......... *B64D 11/0696* (2013.01); *B29C 64/00* (2017.08); *B33Y 10/00* (2014.12);
(Continued)

(58) Field of Classification Search
CPC ... B64D 11/0696; B29C 67/0051; B64C 1/18; B29K 2077/00; B29L 2031/3041
See application file for complete search history.

(56) References Cited

U.S. PATENT DOCUMENTS 3,938,764 A * 2/1976 McIntyre .................. B64C 1/18
137/68.11
4,066,285 A * 1/1978 Hall ........................ B60R 13/04
280/770

(Continued)

FOREIGN PATENT DOCUMENTS

| DE | 3304747 | 9/1984 |
|---|---|---|
| DE | 199947148 | 4/2001 |
| DE | 102009056414 | 6/2011 |

OTHER PUBLICATIONS

German Search Report, dated Dec. 22, 2016 for Appl. No. 10 2016 206 386.3.

*Primary Examiner* — Anita M King
(74) *Attorney, Agent, or Firm* — Greer, Burns & Crain, Ltd.

(57) ABSTRACT

A seat rail cover includes a retaining section, configured to be introduced at least partially into a part of the seat rail, and a cover section, configured to cover the seat rail when the retaining section is introduced into the seat rail. At least the cover section of the seat rail cover is formed in one piece by 3D printing. Geometry, surface texture, color composition and/or color pattern of at least a visible part of the cover section in the installed state of the seat rail cover are matched to a surface and/or a floor covering of a floor element next to a seat rail to which the seat rail cover is connectable. Furthermore, a floor element with a seat rail and a seat rail cover as well as an aircraft with such a floor element. A method for manufacturing a seat rail cover by 3D printing.

15 Claims, 3 Drawing Sheets

(51) Int. Cl.
  *B29C 64/00* (2017.01)
  *B29K 77/00* (2006.01)
  *B29L 31/30* (2006.01)

(52) U.S. Cl.
  CPC ............... *B33Y 80/00* (2014.12); *B60N 2/00* (2013.01); *B64C 1/18* (2013.01); *B29K 2077/00* (2013.01); *B29L 2031/3041* (2013.01); *Y02T 50/46* (2013.01)

(56) References Cited

U.S. PATENT DOCUMENTS

| | | | |
|---|---|---|---|
| 4,089,140 A * | 5/1978 | McIntyre | B64C 1/18 244/117 R |
| 4,201,359 A * | 5/1980 | Baslow | B44C 7/022 160/392 |
| 5,743,064 A * | 4/1998 | Bennett | B29C 66/4722 256/59 |
| 6,345,480 B1 * | 2/2002 | Kemper | E04F 19/061 403/118 |
| 7,281,685 B2 * | 10/2007 | Schoene | B64D 11/0696 244/118.6 |
| 8,966,847 B2 * | 3/2015 | Kessler | E04B 1/6804 52/395 |
| 2002/0144835 A1 * | 10/2002 | Samhammer | H02G 3/0418 174/72 A |
| 2005/0247820 A1 | 11/2005 | Feist et al. | |
| 2006/0097109 A1 | 5/2006 | Laib et al. | |
| 2015/0145298 A1 | 5/2015 | Wottke et al. | |
| 2018/0370078 A1 * | 12/2018 | Haibach | B29C 33/38 |

* cited by examiner

SEAT RAIL COVER FOR COVERING A SEAT RAIL IN A VEHICLE FLOOR AND METHOD FOR MANUFACTURING A SEAT RAIL COVER

CROSS REFERENCE TO RELATED APPLICATIONS

This application claims priority to German Patent Application No. 10 2016 206 386.3 filed on Apr. 15, 2016, the entirety of which is incorporated herein by reference.

FIELD OF THE INVENTION

The invention relates to a seat rail cover for covering a seat rail in a floor of a means of transport, for example an aircraft, train, bus or other vehicle. The invention further relates to a floor element with a seat rail incorporated into it and a seat rail cover, an aircraft with such a floor element and a method for manufacturing a seat rail cover. In particular, the invention relates to a seat rail cover manufactured in one piece by means of a 3D printing method with a retaining section and a cover section.

To attach aircraft seats, seat rails are integrated into floor elements for aircraft. These seat rails normally run in the longitudinal direction of the aircraft, so that aircraft seats or rows of seats can be fitted at certain spacings from one another depending on the cabin class. Usually at least two seat rails running parallel to one another are used to attach an aircraft seat or a row of aircraft seats. Such seat rails have a profile that is mostly taken up completely in the floor element, wherein an upper side of the seat rail facing into the aircraft interior is open. Attachment means of the aircraft seats can thereby engage into the seat rails and be in fixed engagement with the floor element via other elements.

The seat rails are open towards the aircraft cabin between two consecutive aircraft seats or rows of aircraft seats. In order to prevent objects from getting into the seat rails or passengers from getting caught on them, seat rail covers are inserted into the seat rails, wherein they cover over the seat rail. The seat rail covers were cut to size according to the seat spacings and incorporated.

Most airline companies have preferred color schemes for the aircraft cabin. Previous seat rail covers are plain and mostly only available in a few color shades. The color of the seat rail covers therefore rarely matches the preferred color scheme of the airline companies, and the visual impression of the aircraft cabin suffers from this.

An object of the invention is therefore to provide a seat rail cover that has a surface that harmonizes in color or texture with the cabin floor as a whole and can be adapted to this effect.

SUMMARY OF THE INVENTION

This object may be achieved by a seat rail cover with the features of one or more embodiments described herein, a floor element according to one or more embodiments described herein, an aircraft according to one or more embodiments described herein and a method for manufacturing a seat rail cover with the features of one or more embodiments described herein A seat rail cover for covering a seat rail in a floor of a vehicle comprises a retaining section and a cover section. The retaining section is configured to be fitted at least partially into a part of the seat rail. The cover section is configured to cover the seat rail when the retaining section is fitted in the seat rail. The cover section of the seat rail cover is formed in one piece by a 3D printing method. Furthermore, the geometry, surface texture, color composition and/or color pattern of the seat rail cover may be adapted. In particular, a part of the cover section that is visible in the installed state of the seat rail cover may be matched with regard to its geometry, surface texture, color composition and/or color pattern to the subsequent vehicle interior, for example to a surface and/or a floor covering of a floor element next to a seat rail, to which the seat rail cover can be connected.

In the 3D printing process, a three-dimensional workpiece is formed in layers from one or more solid or liquid materials. The relevant material is melted or sintered (in the case of solid materials) or cured (in the case of liquid materials, such as resins, for example) by certain methods, for example a laser or another light source. The three-dimensional workpiece may also be created by means of a molten layer process, in which a plastic or wax material is applied by heating and extrusion at certain points. In each of these 3D printing methods a thin layer of the material is always added ("printed onto") the part of the workpiece already produced and joined to the existing material to form a unit (one-piece).

As well as the favorable process, the use of a 3D printer also offers the option that the material to be used is freely selectable in color terms, so that it matches the subsequent vehicle interior. A full color seat rail cover with any desired surface texture can be produced by this. A seat rail cover may also be manufactured in any desired or required length, so that cutting to size is not required later.

3D printing also permits the geometry, surface texture, color composition and/or color pattern of the seat rail cover to be realized directly during the manufacture of the seat rail cover. For example, the color composition and/or a color pattern may be realized by the material of the seat rail cover, in particular of the visible part of the cover section.

Furthermore, the retaining section (110) and the cover section (120) of the seat rail cover (100) may be formed in one piece by means of a 3D printing method. In this case the entire seat rail cover can be manufactured in a single production step, whereby time and cost can be saved.

Alternatively or in addition, a part of the cover section that is visible in the installed state of the seat rail cover may contain one or more images, logos and/or designs. These images, logos and/or designs can be integrated in this case directly into the material of the seat rail cover.

In each case the visible part of the cover section can be produced individually and according to customer wishes in its form (geometry and surface texture) and its appearance (color composition, color pattern, images, logos, designs etc.) by the 3D printing. The retaining area of the seat rail cover and also a part of the cover section that is not visible later can be produced by an inexpensive plain material. One or more other materials can then be used only for the visible part of the cover section to achieve the desired attributes of the visible part of the cover section. For example, just a thin layer of the visible part of the cover section may be manufactured from a material of a color that meets the customer requirements. A multicolored pattern, image, logo, design etc. may also be integrated in this thin layer by corresponding use of different materials. A fluorescent material may also be used to integrate emergency aids (symbols, direction arrows to the nearest exit etc.) into the seat rail cover.

For the manufacture of the seat rail cover, the material(s) used may be a synthetic material. For example, a polyamide such as PA12 may be used. Depending on the 3D printing method used, another material may also be used for the seat rail cover, such as resin, metal, metal alloys or also composite materials, for example.

Alternatively or in addition, the color composition and/or the color pattern of the seat rail cover, more precisely the visible part of the cover section, may also be produced by a transfer printing method (sublimation printing). In this case a dye is vaporized (sublimated) into the surface of the seat rail cover that is visible later. To this end a transfer film with the corresponding color scheme, color pattern, image, logo, design etc. may be applied to the cover section and the color transferred by means of heat and/or pressure to the cover section.

The retaining section of the seat rail cover is configured so that the seat rail cover is held in the seat rail by a clamping effect. For this the retaining section may be designed wider than the interior dimension of the seat rail. Alternatively or in addition, the retaining section may comprise laterally protruding elements, which achieve the clamping effect on the inside of the seat rail and/or engage with elements arranged in the seat rail. The retaining section may naturally also have a shape that corresponds to the inside of the seat rail, in order thus to guarantee a firm grip.

For example, the retaining section may comprise an element that is T-shaped or cruciform in cross section. A clamping effect in the seat rail is achieved by the ends of such a retaining section on the one hand. On the other hand, the seat rail holder may be supported on an underside of the seat rail, due to which damage to the seat rail cover due to pressing too far into the seat rail is prevented. The retaining section may consist of several elements that are T-shaped or cruciform in cross section. These elements are advantageously arranged adjacent to one another in the longitudinal direction of the seat rail cover. The stiffness of the retaining section and the entire seat rail cover can be increased by several such elements. In both cases material can be saved by the retaining section not filling the inside of the seat rail completely with material.

Alternatively or in addition, the retaining section may also comprise other cross section shapes. For example, the retaining section may be circular, elliptical, polygonal or a combination thereof in cross section or have any other shape. Achieving a clamping effect in the seat rail and optionally a supporting effect on the underside of the seat rail should be guaranteed by the cross section shape of the retaining section.

Alternatively or in addition, the retaining section may also be produced from a different material than the cover section. In this case the retaining section may comprise a material that is particularly suitable to achieve a clamping effect. For example, an elastic polymer may be used, which is pressed into the inside of the seat rail. The cover section may be manufactured from a harder, less elastic material. The wear of the cover section can be reduced by this and the feel when stepping on the seat rail cover improved.

According to another aspect, a floor element for a vehicle, for example an aircraft, may comprise at least one seat rail arranged in the floor element and being adapted to attach at least one seat, and a seat rail cover. Here the seat rail cover may be arranged in a part of the seat rail (seen in a longitudinal direction of the seat rail) to which no seat is attached. The seat rail cover may further form a unit visually with a visible area of the floor element adjacent to the seat rail. For example, the geometry, surface texture, color composition and/or color pattern of at least one visible part of the seat rail cover may be matched to a surface of the floor element next to the seat rail. Each of the seat rail covers described above and their variants may be used in the floor element.

Furthermore, the floor element may comprise a floor covering applied next to the seat rail. In this case the geometry, surface texture, color composition and/or color pattern of the visible part of the seat rail cover may be matched to the floor covering next to the seat rail.

The cover section of the seat rail cover may further lie substantially in one plane with the floor covering. The floor covering may be a carpet or similar fiber cover. The floor covering advantageously extends so far up to the seat rail that the cover section of the seat rail cover does not overlap with the floor covering when the seat rail cover is arranged in the seat rail. A secure insertion of the seat rail cover into the seat rail and also easy subsequent removal can be guaranteed by this. However, to avoid gaps and other obstacles, the floor covering and the cover section of the seat rail cover may be designed so that their lateral end faces abut one another. The cover section of the seat rail cover may naturally also overlap the floor covering, in order to fix its lateral ends to the floor element, for example, and to prevent detachment.

Alternatively or in addition, the cover section of the seat rail cover may form a unit visually with the floor covering. For example, a visible part of the cover section may be matched in geometry, surface texture, color composition and/or color pattern, as described above, to the floor covering.

According to another aspect, an aircraft may be equipped with at least one such floor element.

According to another aspect, a method for manufacturing a seat rail cover for covering a seat rail in a floor of a vehicle comprises the method step of manufacturing a one-piece cover section by a 3D printing method. The cover section is formed to cover the seat rail. The geometry, surface texture, color composition and/or color pattern of at least one visible part of the cover section in the installed state of the seat rail cover may be matched to a surface and/or a floor covering of a floor element next to the seat rail to which the seat rail cover is connectable.

Furthermore, during at least a part of the manufacturing step for the cover section, one or more different synthetic material(s) may be used. Alternatively or in addition to synthetic material, another material such as resin, metal, a composite material etc. may also be used in one or both of the manufacturing steps.

One or more images, logos, designs etc. may also be introduced into the visible part of the cover section during the manufacturing step for the cover section. For this synthetic materials (or other materials) of different colors may be used in the 3D printing process on the part of the cover section that is visible from the interior of the vehicle following production of the seat rail cover.

In addition the manufacturing method may comprise a step of manufacturing a retaining section from synthetic material. The retaining section is formed to be introduced at least partially into a part of the seat rail. Advantageously both manufacturing steps for the retaining section and the cover section by the 3D printing method are carried out so that the seat rail cover is formed in one piece.

The manufacturing method for the seat rail cover may comprise the 3D printing of the seat rail cover in a longitudinal direction. In other words, layers that form the cross section area of the seat rail cover are applied in 3D printing one after another, so that the seat rail cover "grows" in its longitudinal direction. The greatest part of the seat rail cover, in particular the retaining section and at least the non-visible part of the cover section, may be printed from a favorable material of any color. Only a small area or a thin layer of the cover section that will be visible later may be produced using one or more other materials. The desired, visible and tactile properties of the seat rail cover (geometry, surface texture, color composition, color pattern, images, logos, designs etc.) can be achieved by this.

In this manufacturing method the seat rail cover can be manufactured in any length, at least within the capabilities of the 3D printer used. The seat rail cover can be manufactured according to customer requirements and in a custom fit for the respective seat spacing. Subsequent cutting of the seat rail cover depending on the seat spacings is no longer necessary.

Alternatively the seat rail cover can be manufactured orthogonally to the longitudinal direction of the seat rail cover in the 3D printing process. In particular, the seat rail cover can be printed from bottom to top (when looking at the cross section of the seat rail cover in the installed state). Since in the 3D printing process a thin layer of the material is always applied and fused or otherwise bonded with the workpiece already produced, the retaining section and the non-visible part of the cover area can be produced initially with a favorable material. The last layer(s) to be applied can then be produced using one or more materials that realize the desired, visible and tactile properties of the seat rail cover (geometry, surface texture, color composition, color pattern, images, logos, designs etc.). This offers the advantage that even more expensive materials are used specifically only at the end of the printing process and can possibly be used more sparingly. The possible length of the seat rail cover is geared to the maximum printing width of the printer.

Regardless of the printing direction, the retaining area and the cover area (the latter at least partly) may be manufactured from different materials. The materials may be selected here according to the demands made on the retaining area and the cover area. Only the bond of such different materials during the 3D printing should be given.

BRIEF DESCRIPTION OF THE DRAWINGS

Preferred embodiments of the invention are now explained with reference to the enclosed schematic designs, wherein.

DETAILED DESCRIPTION OF EMBODIMENTS OF THE INVENTION

In the present description of the invention, information such as "top", "bottom", "right", "left", "laterally" refer to a seat rail cover or seat rail in the installed state. Both elements are elongated components, which in the installed state run substantially parallel to the longitudinal direction of a vehicle, such as an aircraft, for example.

Figure 1:
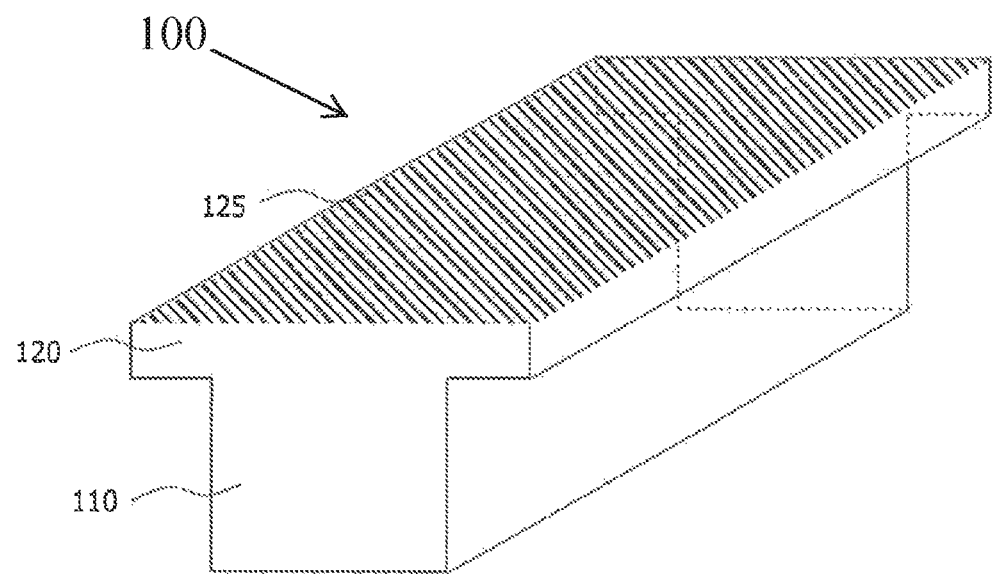
FIG. 1 shows a three-dimensional view of a seat rail cover schematically.

FIG. 1 shows a schematic, highly simplified three-dimensional view of a seat rail cover 100. The seat rail cover 100 comprises a retaining area 110 and a cover area 120. The retaining section 110 is configured to be introduced at least partially into a part of a seat rail. In FIG. 1 the retaining area 110 is shown in the shape of a cuboid. This serves only to illustrate that the retaining area 110 may be formed narrower than the cover area 120. The retaining area 110 must fit into the interior of a seat rail in order to achieve a clamping effect there and thus hold the seat rail cover 100 firmly. The cover area 120, on the other hand, should be designed and dimensioned so that it completely covers the seat rail. In other words, the cover area 120 should be of the same width or slightly wider than the seat rail, for example the lateral outer edges of the seat rail.

Figure 2:
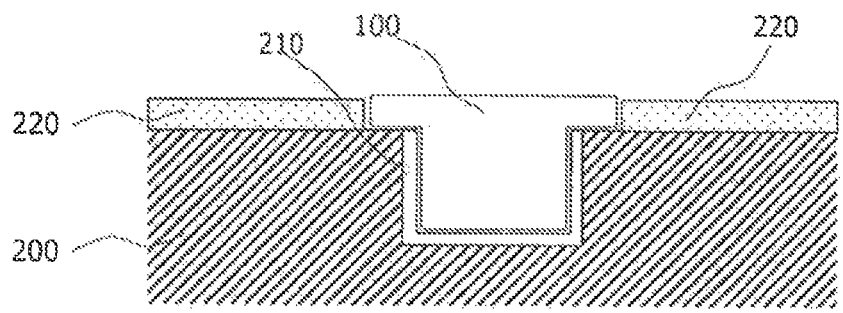
FIG. 2 shows a section of a floor element with seat rail and seat rail cover inserted therein schematically in cross section.

FIG. 2 shows schematically a section of a floor element 200 with seat rail 210 and seat rail cover 100 inserted therein in cross section. The seat rail 210 is likewise highly simplified and only shown schematically. In FIG. 2 the seat rail 210 has a U-shaped profile. The cross section of the seat rail 210 may naturally have another shape also. For example, the seat rail 210 may consist of a tube cut open or similar round or elliptical body. Fixtures may further be arranged in the inside of the seat rail 210 or integrated into the seat rail 210, to which vehicle seats (not shown) are attached. To make it possible to move the seats (displace the seats in the longitudinal direction of the vehicle), the seat rail 210 may be open continuously towards the top, as is clear from FIG. 2. Furthermore, the upper seat rail opening may be formed narrower than the width of the inside of the seat rail. A better fixture for the seat and also the seat rail cover can be achieved by this.

An optional floor covering 220 applied to the floor element is also shown. The floor element 200 is shown hatched here, while the floor covering 220 is shown dotted. The floor covering 220, for example a carpet or other coating of the floor element 200, is preferably applied on both sides next to the seat rail 210. The gap shown in FIG. 2 between floor covering 220 and cover section 120 of the seat rail cover 100 only serves to clarify the different components. The lateral end faces of the floor covering 220 and the cover section 120 may in fact abut one another or even overlap, so that the accumulation of dirt in such gaps and any tripping hazards for the passengers are avoided.

With reference to FIGS. 1 and 2, a visible area 125 (FIG. 1) of the cover section 120 of the seat rail cover 100 is now described. In FIG. 1 the visible area 125 is shown hatched. The visible area 125 differs from the rest of the seat rail cover 100 in that it has certain visible and/or tactile properties. These properties are used to match the seat rail cover 100 to the vehicle interior, such as an aircraft cabin, for example. For example, the geometry, surface texture, color composition and/or color pattern of the visible area 125 (i.e. the visible part 125 of the cover section 120 in the installed state of the seat rail cover 100) may be matched to the vehicle interior, and in particular to a floor covering 220 to be arranged next to the seat rail 210. It is also possible to integrate one or more images, logos, designs or similar into the visible area 125 of the cover section 120.

The geometry of the visible area 125 may be matched to the floor covering 220. For example, the cover area 120 may taper towards its lateral ends to be matched to the thickness (height) of the floor covering 220. A reinforcement can thus be achieved in the middle of the seat rail cover. The cover area 120 may naturally also have the same height continuously as the floor covering 220 when the seat rail cover 100 is arranged in the seat rail 210.

Alternatively or in addition, surface textures can also be realized in the visible area 125. For example, elevations and recesses may be present on the upper side of the seat rail cover 100. These elevations and recesses may have any shapes, be distributed randomly and/or represent patterns (for example logos, characters, numbers etc.) at least in sections. In a simple configuration of the seat rail cover 100, a surface texture of a floor covering 220 arranged next to the seat rail 210 is recreated. A continuous floor covering can be imitated by this.

Alternatively or in addition to the surface texture, the visible area may have a certain color composition and/or a color pattern. The seat rail cover 100 may be matched visually to the floor covering 220 by this, so that the seat rail cover 100 forms a unit with the rest of the floor covering 220 and does not stand out from the floor covering 220. The color and/or the color pattern in the visible area 125 can thus be produced individually according to the wishes of the customer (such as the airline operator).

Finally, images, logos and/or designs may be integrated in the visible area 125. Thus a logo of the vehicle operator (such as the airline company) may be integrated into the seat rail cover 100 by a corresponding surface texture or colors. The various cabin classes can be identified or pointers to emergency exits, the nearest toilet and/or similar can be shown also by characters or symbols. Fluorescent materials, which continue to be visible in an emergency, may also be used for this. The option is further offered of showing advertising in the visible area 125, whereby the income of the vehicle operator can be increased.

The cuboid retaining section 110 shown in FIG. 1 serves only to clarify that the retaining section 110 is arranged in a certain area under the cover section 120 and fits into the inside of the seat rail 210. However, any shape of the retaining section 110 may be selected, and matched to the shape of the inside of the seat rail 210, for example.

Figures 3A, 3B:
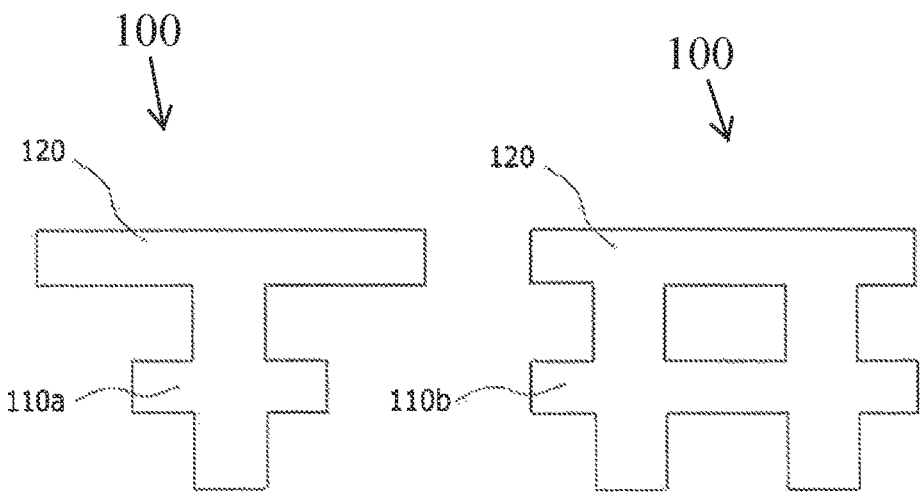
FIGS. 3A, 3B show variants of a seat rail cover schematically in cross section.

FIGS. 3A and 3B show schematically two exemplary variants of the retaining section 110 of a seat rail cover 100 in cross section. In a simple configuration, such as is shown in FIG. 3A, the retaining section 110 comprises an element 110a that is T-shaped or cruciform in cross section. This simple shape offers an element in the shape of the horizontal web that achieves a clamping effect in the seat rail 210 for holding the seat rail cover 100. That part of the retaining section 110a running vertically is used on the other hand to support the seat rail cover 100 on the base area of the interior of the seat rail 210. Pressing the seat rail cover 100 too deeply into the seat rail 210 is thus prevented. This simple form of the retaining section 110a requires very little material, due to which the seat rail cover 100 is not only inexpensive to manufacture, but also saves weight.

In FIG. 3B a seat rail cover 100 is shown on which the retaining section 110 comprises several elements 110b that are T-shaped or cruciform in cross section. Even more than the two T-shaped or cruciform elements 110b shown can naturally also constitute the retaining area 110. This form of the retaining area 110 offers increased stability of the seat rail cover 100.

In any case the retaining area 110 with T-shaped or cruciform element 110a, 110b may comprise even more than one horizontal web. The clamping effect inside the seat rail 210 can be increased by this. The position of the horizontal web(s) is naturally not restricted to the position shown in FIGS. 3A and 3B. On the contrary, it/they may be arranged in another place, such as the lower end of the vertical web, for example.

Alternatively or in addition to the horizontal web, forms running obliquely or round forms may also protrude from the retaining section 110. The retaining section 110 may naturally also have a special external form in cross section that is matched to the inside of the seat rail 210 or corresponds to this. In other configuration options of the retaining section 110, this may also have one or more circular, elliptical or polygonal shapes in cross section. Combinations of these shapes and/or parts of these shapes may naturally also determine the cross section of the retaining section 110. In any case the retaining section 110 can prevent or at least make difficult a removal of the seat rail cover 100 from the seat rail 210.

Figure 4A:
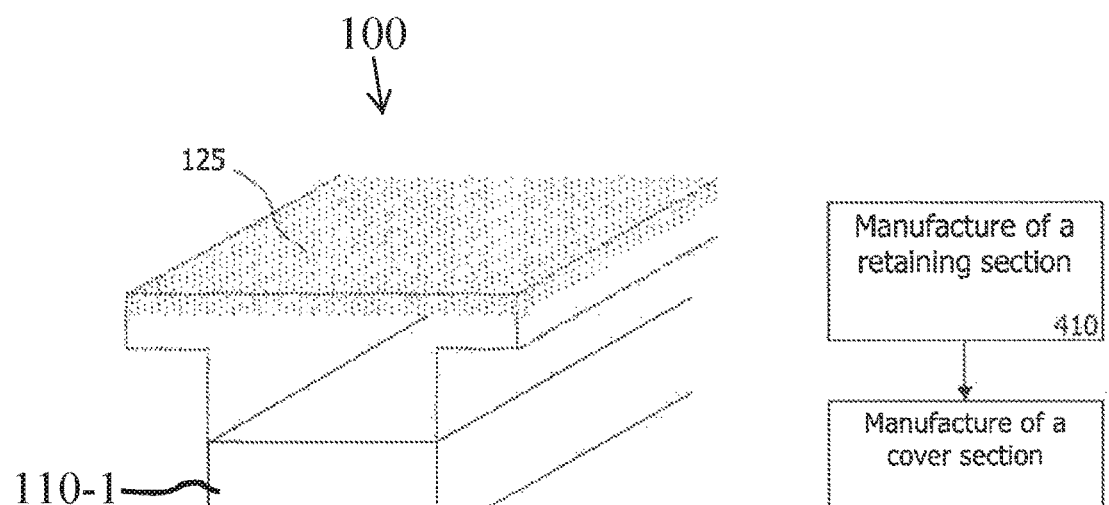
FIGS. 4A, 4B show schematically variants of manufacturing methods of a seat rail cover by means of 3D printing.
Figure 4B:
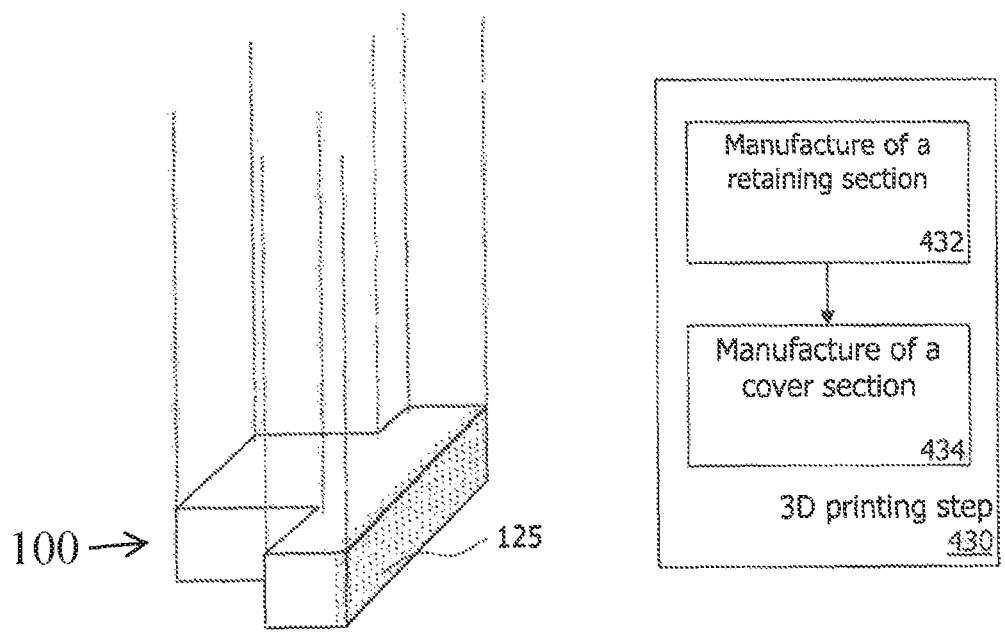

FIGS. 4A and 4B likewise show schematic variants of manufacturing methods of a seat rail cover by 3D printing. In FIG. 4A the seat rail cover 100 is printed in 3D printing perpendicular to the longitudinal direction of the seat rail cover 100. FIG. 4A shows a state during the manufacturing method by means of 3D printing in which a lower part 110-1 of the retaining section 110 was already manufactured (step 410). This area 110-1 is shown by continuous lines, while the area of the seat rail cover 100 still to be printed is shown by dotted lines.

In the variant of the manufacturing method shown in FIG. 4A, a thin material layer is applied to a base or a part 110-1 already manufactured of the seat rail cover 100 and melted on or cured (depending on the material) by a laser or other means. Thus the retaining area is manufactured first (step 410) and then the cover area is manufactured (step 420). The seat rail cover thus "grows" from bottom to top.

In this manufacturing variant, the length of the seat rail cover 100 is limited to the maximum working width of the 3D printer. However, it offers the advantage that a favorable material or also different materials may be used for the retaining area 110 and possibly also a part of the cover section 120. Only at the end of the manufacturing method is the visible area 125 printed, wherein only here must materials be used that permit the desired geometry, surface texture, color composition and/or color pattern in the visible area 125.

In a second variant of the manufacturing process by means of 3D printing, as shown schematically in FIG. 4B, the seat rail cover 100 is printed in a longitudinal direction of the seat rail cover 100. In this case a material layer is applied in the cross section plane of the subsequent seat rail cover 100 and melted on or cured by laser or other methods (step 430). In this print variant the retaining area is manufactured (step 432) and also the cover area is manufactured (step 434) in one printing step 430. The seat rail cover thus "grows" in its length. In this case the material that forms the area 125 subsequently visible may be applied in each printing step 430 (each layer to be manufactured) in the area 125 shown dotted in FIG. 4B. Here the different colors and/or color progressions to produce the color designs, color patterns, images, logos, designs etc. are applied accordingly in a linear manner (per printing step/print layer 430). In this case seat rail covers 100 can be manufactured in any desired or necessary length.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A seat rail cover for covering a seat rail in a floor of a vehicle, wherein the seat rail cover comprises:
   a retaining section, which is configured to be introduced at least partially into a part of the seat rail; and a cover section, which is configured, when the retaining section is introduced into the seat rail, to cover the seat rail, wherein at least the cover section of the seat rail cover is formed in one piece by a 3D printing method, and wherein at least one of a geometry of at least a visible part of the cover section in the installed state of the seat rail cover, a surface texture of at least the visible part of the cover section in the installed state of the seat rail cover, a color composition of at least the visible part of the cover section in the installed state of the seat rail cover, and a color pattern of at least the visible part of the cover section in the installed state of the seat rail cover is matched to at least one of a surface and a floor covering of a floor element next to the seat rail to which the seat rail cover is connectable, and, wherein the cover section and retaining section are made from different materials.

2. The seat rail cover according to claim 1, wherein the retaining section and the cover section of the seat rail cover are formed in one piece by a 3D printing method.

3. The seat rail cover according to claim 1, wherein the visible part of the cover section in the installed state of the seat rail cover contains one or more of at least one images, logos, and designs.

4. The seat rail cover according to claim 1, wherein the seat rail cover comprises a synthetic material.

5. The seat rail cover according to claim 1, wherein the retaining section is configured to hold the seat rail cover by clamping action in the seat rail.

6. The seat rail cover according to claim 1, wherein the retaining section comprises an element that is T-shaped in cross section.

7. A floor element for a vehicle, comprising:
at least one seat rail arranged in the floor element and being adapted to attach to at least one seat; and
a seat rail cover according to claim 1, which is arranged in a part of the seat rail to which no seat is attached,
wherein at least one of a geometry, a surface texture, a color composition, and a color pattern of at least the visible part of the seat rail cover in the installed state of the seat rail cover is matched to a surface of the floor element next to the seat rail.

8. The floor element according to claim 7, further comprising:

a floor covering applied next to the seat rail,
wherein the at least one of the geometry, the surface texture, the color composition, and the color pattern of the visible part of the seat rail cover is matched to the floor covering next to the seat rail.

9. An aircraft with at least one floor element according to claim 7.

10. The seat rail cover according to claim 1, wherein the retaining section comprises an element that is cruciform in cross section.

11. The seat rail cover according to claim 1, wherein the retaining section comprises several elements that are T-shaped or cruciform in cross section, or both.

12. A method for manufacturing a seat rail cover, wherein the seat rail cover serves to cover a seat rail in a floor of a vehicle, and comprises a retaining section, which is configured to be introduced at least partially into a part of the seat rail, and a cover section, which is configured, when the retaining section is introduced into the seat rail, to cover the seat rail, and wherein the method comprises:
manufacturing a one-piece cover section by 3D printing, wherein the cover section is formed to cover the seat rail,
wherein at least one of a geometry, a surface texture, a color composition, and a color pattern of at least a visible part of the cover section in the installed state of the seat rail cover is matched to at least one of a surface and a floor covering of a floor element next to a seat rail to which the seat rail cover is connectable, and,
wherein the cover section and the retaining section are made from different materials.

13. The method according to claim 12, further comprising:
manufacturing the retaining section, and,
wherein the manufacturing steps for the retaining section and the cover section are executed by 3D printing methods in such a way that the seat rail cover is formed in one piece.

14. The method according to claim 12, wherein the seat rail cover is printed in 3D printing in a longitudinal direction of the seat rail cover.

15. The method according to claim 12, wherein the seat rail cover is printed in 3D printing perpendicular to the longitudinal direction of the seat rail cover.

* * * * *